United States Patent [19]

Wu et al.

[11] Patent Number: 5,709,476

[45] Date of Patent: Jan. 20, 1998

[54] TEMPERATURE MEASURING DEVICE

[75] Inventors: Frederick L. Wu, Pleasanton; Robert K. Yuan, Berkeley, both of Calif.

[73] Assignee: DeltaTrack, Inc., Modesto, Calif.

[21] Appl. No.: 379,155

[22] Filed: Jan. 27, 1995

[51] Int. Cl.$^6$ .............................. G01K 1/14; B65D 85/38
[52] U.S. Cl. .................................. 374/208; 206/306
[58] Field of Search ..................... 374/208, 209, 374/158; 206/306

[56] References Cited

U.S. PATENT DOCUMENTS

| | | | |
|---|---|---|---|
| 2,586,448 | 2/1952 | Weber et al. | 206/306 |
| 2,943,745 | 7/1960 | Bjornson . | |
| 3,036,699 | 5/1962 | Huber | 206/306 |
| 3,100,044 | 8/1963 | Gardner | 206/306 |
| 3,151,739 | 10/1964 | Guffy | 206/306 |
| 3,321,068 | 5/1967 | Beach . | |
| 3,348,415 | 10/1967 | Ash Jr. | 374/208 |
| 3,580,077 | 5/1971 | Blackman . | |
| 3,768,634 | 10/1973 | Creevy . | |
| 4,099,414 | 7/1978 | Krahmer . | |
| 4,537,518 | 8/1985 | Murase | 374/188 |
| 4,904,091 | 2/1990 | Ward | 374/208 |
| 5,004,355 | 4/1991 | Ryan | 374/194 |
| 5,165,798 | 11/1992 | Watanabe | 374/208 |
| 5,342,126 | 8/1994 | Heston et al. | 374/208 |
| 5,447,374 | 9/1995 | Fraser et al. | 374/208 |

FOREIGN PATENT DOCUMENTS

| | | | |
|---|---|---|---|
| 1262675 | 4/1961 | France | 206/306 |
| 1134528 | 11/1968 | United Kingdom | 206/306 |

OTHER PUBLICATIONS

FIGS. 1–3 of French Patent No. 359290, published Jan. 16, 1916.
Brochure By: Universal Enterprises, Inc. "Pocket Digital Thermometer PDT300K" 2pgs (no date).

Primary Examiner—Diego F.F. Gutierrez
Attorney, Agent, or Firm—Bielen, Peterson & Lampe

[57] ABSTRACT

A temperature measuring device utilizing a thermometer including a temperature sensor and a temperature indicator for displaying a temperature value. The temperature indicator is mechanically and electrically linked to the temperature sensor. A member is sized to at least partially cover the temperature sensor. The temperature sensor is separable from the cover member which includes an aperture which may take the form of a slot. The aperture permits passage of the temperature sensor and also allows the temperature sensor and temperature indicator to be held to the member.

6 Claims, 1 Drawing Sheet

U.S. Patent      Jan. 20, 1998      5,709,476
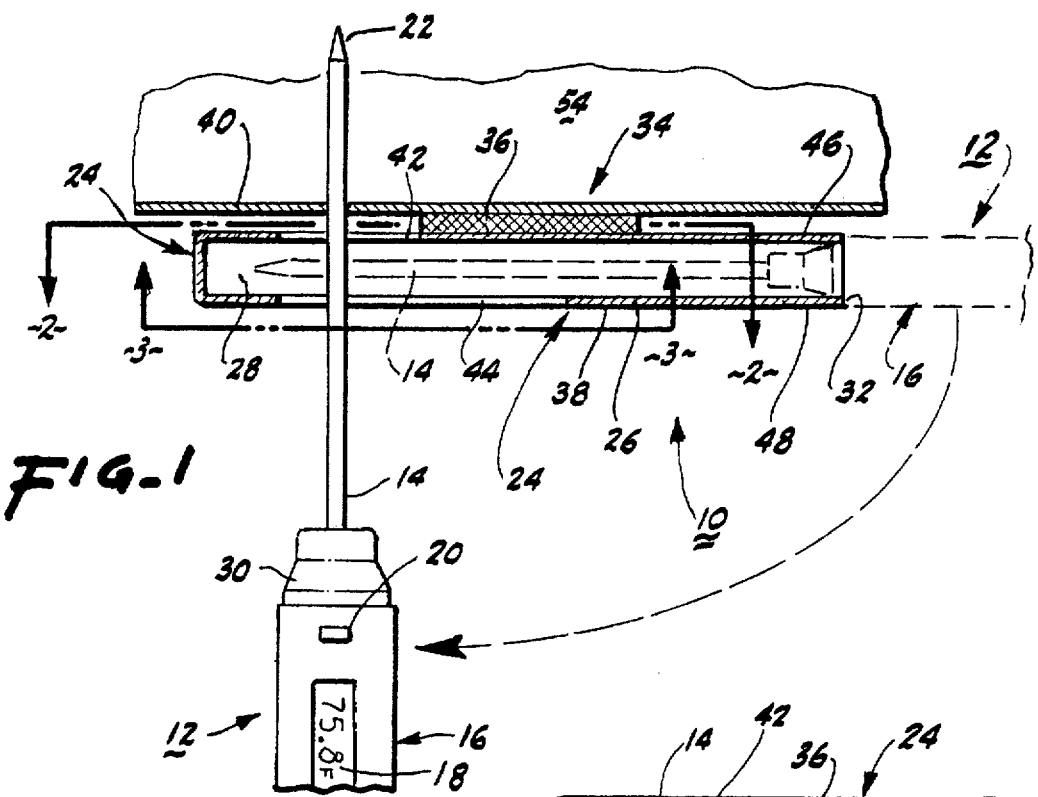
FIG-1
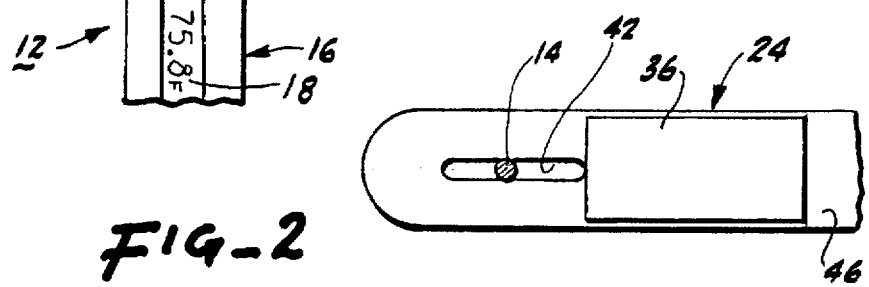
FIG-2
FIG-3
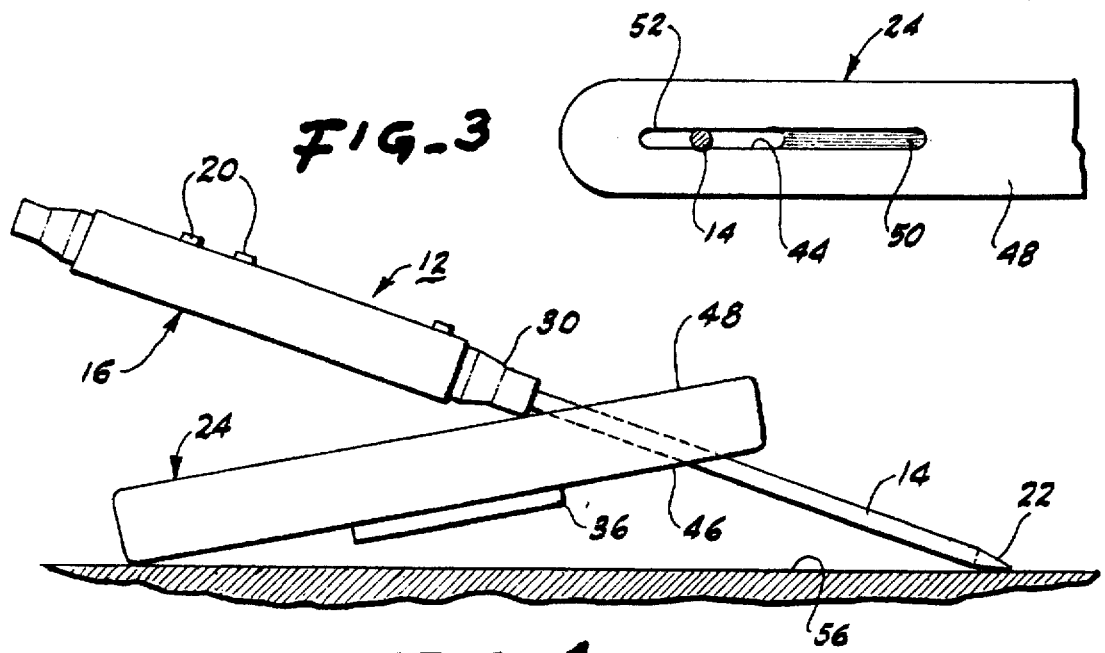
FIG-4

TEMPERATURE MEASURING DEVICE

BACKGROUND OF THE INVENTION

The present invention relates to a novel and useful temperature measuring device.

Thermometers have been employed in many instances to determine the temperature of gases, liquids, and vapors. Many temperature apparatuses are portable and provide the user with temperature information by pressing or holding the thermometer in the vicinity of the object whose temperature is to be measured. Unfortunately, the user often requires the use of both hands to perform other tasks or cannot expend a great deal of time holding a thermometer and waiting for such thermometer to stabilize at a certain temperature before obtaining a reading. In addition, temperature changes are often observed over a long period of time which would be impractical if the thermometer were to be manually held in a position during such period of time.

Many systems have been devised to hold thermometers for use in measuring temperatures. For example, U.S. Pat. Nos. 3,580,077; 4,099,414; and 5,004,355 describe clinical type thermometers that are held in brackets or containers for the purpose of sterilization and the taking of temperatures in medical situations.

U.S. Pat. Nos. 2,943,745; 3,321,068; and 3,768,634 describe systems for supporting thermometers to a surface using holders and fastening type devices, such as clamps and the like.

U.S. Pat. No. 4,537,518 shows a clinical thermometer utilizing a temperature sensor and digital readout. The temperature unit is stored in a case which turns off the power supply when this occurs.

A compact digital thermometer is sold under the designation PDT300K by Universal Enterprise, Inc. of Beaverton, Oreg. The digital thermometer includes a temperature sensing rod which connects to a digital readout. The thermometer fits into a protective cover that includes vent openings.

A temperature measuring device which is convenient to use and may be supported in a variety of positions to measure temperature would be a notable advance in the instrumentation field.

SUMMARY OF THE INVENTION

The present invention relates to a novel and useful temperature measuring device.

The temperature measuring device of the present invention includes a thermometer having a temperature sensor, such as a thermocouple, and temperature indicating means for displaying a temperature value. The temperature indicating means may be a digital readout, an analog readout, or any other suitable visual display. The temperature indicating means is electrically linked to the temperature sensor in order to display temperature being sensed at the end of the temperature sensor. The temperature sensor may include a mitred tip that is capable of lying flush against a surface, when supported in a particular orientation.

A structural member is also included in the present invention and is sized to at least partially cover the temperature sensor. The temperature sensor is separable from the covering member and may snugly fit on or into the member when the member is in place over the temperature sensor. The member may take the form of a sheath having a chamber for at least partially enclosing the temperature sensor. In such an arrangement, the indicating means would lie outside the sheath while the sensor lies within the sheath. Thus, the visual indicating means is available for viewing in this position.

The member may be formed with at least one aperture which extends through the wall portion of the member. Where the member is formed into a sheath, a pair apertures is formed to extend through the wall portions in relative alignment with one another. Each aperture may take the form of a slot and may include a dimension of elongation. One of the slots may be smaller along the dimensions of elongation, than the other slot. Moreover, one of the slots may include a tapered width or narrowing along the dimension of elongation to permit wedging of the temperature sensor when it lies in the aperture. Thus, each of the apertures is sized to permit such passage of the temperature sensor and at least one of the apertures is configured to hold the temperature sensor portion of the thermometer, when it is wedged into frictional engagement with the walls of the aperture or slot. Also, the temperature sensor and thermometer including the display may be supported by the member. In certain orientations, the tip portion of the temperature sensor may be placed to lie flush with a horizontal surface while the display of the thermometer extends upwardly from the surface for viewing the sense temperature reading of the surface. Contact between the temperature indicating means and the member as well as passage of the temperature sensor through the apertures permit such a support.

Moreover, the thermometer cover member may be fitted with supporting means for holding the member to a surface. Such holding means may take the form of a mastic, magnetic strip, and the like. In the latter case, such magnetic strip permits the temperature sensor held by the member to extend into a vertical or overhead register, while the magnetic strip would hold the member and the connected temperature sensor in this position against the pull of gravity.

It may be apparent that a novel and useful temperature measuring device has been described.

It is therefore an object of the present invention to provide a temperature measuring device which is simple and convenient to use and includes provision for supporting the thermometer portion of the temperature measuring device in an upright position on a surface.

It is another object of the present invention to provide a temperature measuring device which includes a thermometer that interacts with a cover to support the thermometer and temperature sensor to a vertical or overhead surface.

Yet another object of the present invention is to provide a temperature measuring device that is simple to manufacture and operate.

Another object of the present invention is to provide a temperature measuring device which is compact and may be accurately used by a person requiring both hands to perform other tasks such as recordation data, inspection of other peripheral items, and the like.

Yet another object of the present invention is to provide a temperature measuring device which includes a cover member that may also be employed as a support for the thermometer in various orientations.

The invention possesses other objects and advantages especially as concerns particular characteristics and features thereof which will become apparent as the specification continues.

BRIEF DESCRIPTION OF THE DRAWINGS

FIG. 1 is a side elevational view of the thermometer and cover member of the present invention interacting to hold the thermometer against an overhead surface for the purpose of measuring temperature.

FIG. 2 is a sectional view taken along lines 2—2 of FIG. 1.

FIG. 3 is a sectional view taken along lines 3—3 of FIG. 1.

FIG. 4 is a side elevational view of the temperature measuring device of the present invention showing interaction of the cover member and thermometer portion thereof to support the temperature sensor for measurement of temperature on horizontal surface.

For a better understanding of the invention reference is made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiments which should be referenced to the prior described drawings.

The invention as a whole is shown in the drawings by reference character 10. The temperature measuring device 10 includes as one of its elements a thermometer 12 which includes a narrow elongated temperature sensor or thermocouple 14 connected to and linked mechanically and electronically to relatively wide indicating means 16. The temperature sensor 14 may be a rigid body indicating means 16 possesses a digital display 18 and a plurality of depressible keys 20 which activate the various functions of thermometer 12, such as on/off, centigrade-fahrenheit, holding of the temperature displayed on display 18, and the like. As depicted in FIG. 1, thermometer 12 is essentially identical to the thermometer PDT300K sold by Universal Enterprises, Inc. of Beaverton, Oreg., hereinbefore described. That is to say, temperature sensed at angled tip portion 22 is transduced into an electric signal which is shown on digital display 18 through appropriate circuitry.

Temperature measuring device 10 also includes as one of its elements a member 24 which serves as a cover for elongated temperature sensor 14. With reference to FIG. 1, it may be observed that temperature sensor 14 is depicted in phantom within member 24, which includes a wall portion 26 forming a chamber 28 therewithin. Neck portion 30 of indicating means 16 fits snugly at the mouth 32 of cover member 24. In certain cases, tolerances between neck portion 30 and mouth portion 32 of cover 34 may be predetermined to permit neck portion 30 to snap into place at mouth 32 of member 24. In the embodiment shown in FIG. 1, elongated temperature sensor extends into chamber 28 of cover member 24, i.e., generally parallel to the wall portion 26. Holding means 34 is also depicted in FIG. 1 in the form of magnetic strip 36 which is fastened to the outer surface 38 of wall portion 26. Thus, cover member 24 may be held to metallic surface 40 which may be an overhead or vertical surface.

With reference to FIG. 2, it may be apparent that cover member 24 is formed with a pair of apertures or slots 42 and 44. Aperture or slot 42 is relatively short, and aperture or slot 44 is relatively long along a dimension of elongation. Short slot 42 extends through inside 46 of wall portion 26 while long slot 44 extends through the opposite side 48 of wall portion 26. As depicted in FIG. 1, temperature sensor 14 may extend completely through cover member 24 by passing through both slots 42 and 44 at the same time. Slot 42 is relatively uniform in width along its dimension of elongation, but may be formed with a taper. Long slot 44 is slightly tapered along its dimension of elongation possessing a wide portion 50 and a relatively narrow portion 52. It should be noted that temperature sensor 14 may be forced into narrow portion 52 of slot 44 to wedge the same in place and hold temperature sensor 14, and connected indicating means 16, to cover 24. This configuration is depicted in FIG. 1. That is to say, aperture 44 is sized to permit passage of temperature sensor 14 therethrough and to permit holding of temperature sensor 14 to member 24.

In operation, thermometer 12 may be found within cover member 24 as depicted in FIG. 1 in phantom. In this position, temperature sensor 14 lies within chamber 28 of cover member 24. If the temperature within a space 54 beyond surface 40, such as the interior of a heating duct, is desired to be measured, the user would wedge elongated temperature sensor 14 into position within elongated slot 44 shown in FIG. 3. Such manipulation would connect thermometer 12 to cover member 24. Tip 22 of sensor 14 would then extend within space 54 when cover 24 is placed against horizontal surface 40. Where surface 40 is metallic, holding means 34 in the form of magnetic strip 36 would hold cover 24 and thermometer 12 in place as shown in FIG. 1. Display 18 would then indicate the temperature sensed by thermocouple tip 22 within space 54.

Turning to FIG. 4, it may be observed that cover 24 may be propped upwardly by the interaction of neck portion 30 and side 48 of cover 24. Again, temperature sensor passes through apertures 42 and 44 to extend through chamber 28 of cover member 24 and out to surface 56. Sensor tip 24 would then rest against surface 56 and signal the temperature at that position to indicating means 16 to be read on display 18. The angle formed between cover 24 and temperature sensor 22 may be increased or decreased as desired to provide the proper contact of tip 22 on surface 56 and to raise or lower the height of the interlinked thermometer 12 and cover member 24, as desired.

While in the foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. A temperature measuring device, comprising:

a. a thermometer, including a relative narrow temperature sensor and a relatively wide temperature indicator for displaying a temperature value, said relatively narrow temperature sensor being linked to said temperature indicator; and b. a member, said member being sized to at least partially cover said temperature sensor, said temperature sensor being separable from said member, said member including a first slot having a dimension of elongation with a transverse dimension which tapers along said dimension of elongation, and a second slot having a dimension of elongation therethrough, said first and second slots being sized to permit passage of said relatively narrow temperature sensor, said first slot wedging said relatively narrow temperature sensor to permit holding of said relatively narrow temperature sensor to said member in an orientation for support of said member and said relatively narrow temperature sensor on a horizontal surface, with said relatively wide temperature indicator being raised above the horizontal surface for viewing.

2. The temperature measuring device of claim 1 further comprising supporting means for holding said member to a surface.

3. The temperature measuring device of claim 2 in which said supporting means comprises a magnetic element fixed to said member.

4. The temperature measuring device of claim 1 in which said member includes a wall portion forming a chamber for at least partially enclosing said temperature sensor.

5. The temperature measuring device of claim 1 in which said temperature sensor is a rigid body having a tip portion, said tip portion being capable of passing through said first and second slots to contact the horizontal surface.

6. The temperature measuring device of claim 5 in which said tip portion is a body angled relative to said rigid body.

* * * * *